C. F. M. VAN BERKEL.
HOLDER FOR SLICING MACHINES.
APPLICATION FILED JULY 5, 1917.
1,395,690.  Patented Nov. 1, 1921.
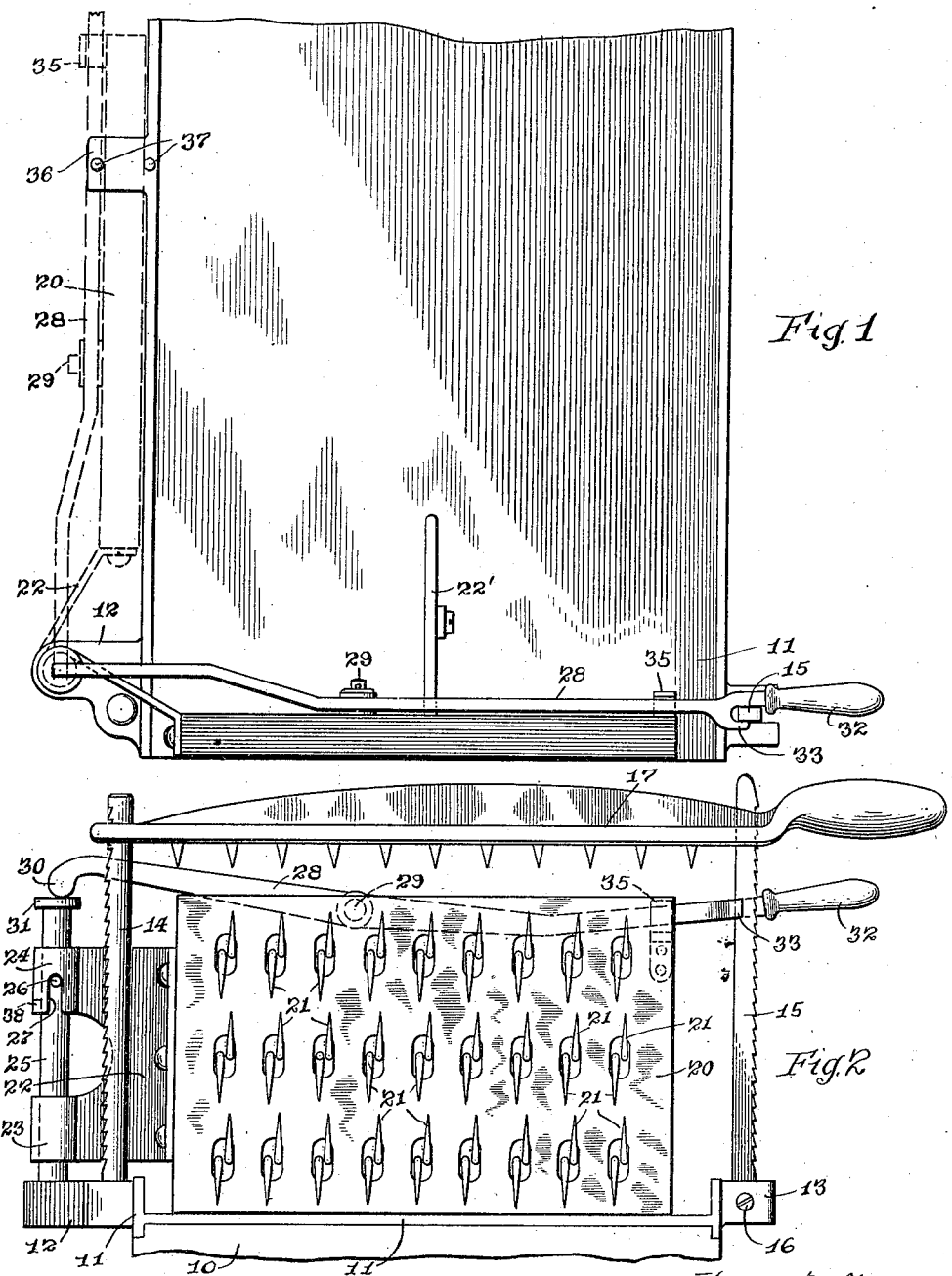
Inventor:
Cornelis F. M. van Berkel
His Att'ys.

UNITED STATES PATENT OFFICE.

CORNELIS F. M. van BERKEL, OF LAPORTE, INDIANA, ASSIGNOR TO U. S. SLICING MACHINE COMPANY, OF LAPORTE, INDIANA, A CORPORATION OF INDIANA.

HOLDER FOR SLICING-MACHINES.

1,395,690. Specification of Letters Patent. Patented Nov. 1, 1921.

Application filed July 5, 1917. Serial No. 178,736.

*To all whom it may concern:*

Be it known that I, CORNELIS F. M. VAN BERKEL, a subject of the Queen of the Netherlands, residing at Laporte, in the county of Laporte and State of Indiana, have invented certain new and useful Improvements in Holders for Slicing-Machines, of which the following is a specification.

This invention relates to slicing machine mechanism for holding material to be sliced and has for its object the provision of mechanism of the kind named which shall be of improved construction and more efficient, convenient and economical in operation than similar mechanism previously known.

The invention is exemplified in the combination and arrangement of parts shown in the accompanying drawing and described in the following specification and it is more particularly pointed out in the appended claims.

In the drawing, Figure 1 is a top plan view of a slicing machine meat plate to which the present invention is applied, Fig. 2 is a front elevation of the mechanism shown in Fig. 1.

A portion of the reciprocating table of a slicing machine of ordinary construction is shown at 10 and slidably mounted on this table is the usual form of meat plate or holder for the material to be sliced shown at 11. At the lateral sides of the front edge of the meat plate 11 are lugs or projections 12 and 13 which carry upright standards 14 and 15 respectively. The standard 14 is rigidly supported from the projection 12 while the standard 15 is pivoted at 16 in the projection 13 and is preferably provided with a spring tending to tilt the upper end of the standard outwardly away from the plate. The standards 14 and 15 are arranged to hold the usual clamping bar 17 in the ordinary manner well known in the art.

In order that pieces of meat or other material may be entirely sliced without any waste, it is usual to provide a back plate with teeth which may be projected into the cut surface of a piece of meat gripping only a thin layer of the piece and thus holding the piece while all of it, except the layer held by the gripping teeth, is being sliced, which layer is of approximately the thickness of a single slice and may be disposed of with the other slices. Machines have been equipped with such devices which are interchangeable with the usual form of meat grip, but in practice such arrangement has been found to be unsatisfactory for the reason that the back plate once having been removed from the machine is usually misplaced or at least must be procured from the place where it is kept when it is needed and so is not used to the extent that it should be.

In the present invention such a plate is so mounted upon the machine that it can be readily moved into and out of operative position and yet is always at hand when it is desired. A back plate or last-slice holder of usual construction is shown at 20 in the drawing and is provided with prongs or teeth 21 operated by a handle 22' to cause them to grip the face of a piece of meat or other material in a well known manner. The back plate 20 has secured to one end thereof a supporting plate 22 provided with bearing eyes 23 and 24 which surround a cylindrical post 25 extending upwardly from the projection 12 and positioned somewhat farther away from the meat plate 11 than is the post 14. The standard 25 is provided with a cross pin 26 arranged to engage a slot 27 extending upwardly from the lower end of the eye, the slot and pin being arranged to prevent rotation of the plate 20 about the standard 25 when the slot is located over the pin. When the pin is in the position shown in Fig. 2, the lower edge of the plate 20 rests upon the upper surface of the support 11. For the purpose of raising the back plate 20 so that the slot 27 may be freed from the pin 26 and the plate rotated about the standard 25 away from its operative position, a lever 28 is pivotally secured to the back plate 20 upon a stud shaft or pivot pin 29. The lever 28 is provided with a rounded bearing knob 30 which rests upon the upper surface of the head 31 of the standard 25. The end of the lever 28 is provided with a hand-hold 32 and a retaining lug 33 arranged to engage the upright 15 to assist the pin 26 in holding the plate 21 against rotation about the upright 25 during the operation of the plate. A bracket 34 is secured to the rear of the back plate 20 and engages the lever 28 to assist in more firmly holding the back plate. When it is desired to rotate the back plate about the standard 25 to move it away from its operative position, the hand-hold 32 is raised a sufficient amount to bring the lower edge of the back plate 20 above the upper surface of the projection 12 and to free the notch 25 from the pin 26. The upright 15 is then moved about its pivot 16 out of engagement with the lug 33, and the lever 28 and back plate 20 are swung about the upright 25 into the position shown in broken lines in Fig. 1. A projection 36 is provided at the side of the rear portion of the meat plate 11, the upper surface of this projection being raised above the surface of the meat plate 11 similar to the projection 12. A pair of upwardly projecting pins 37 are carried by the projection 36 and the plate 20 is lowered between these pins which hold it securely in its inoperative position. A second slot 38 is provided in the bearing eye 24 in position to engage the pin 26 when the plate 20 is located between the pins 37. When the back plate or last-slice device has thus been moved to one side, the meat plate 11 is left entirely unobstructed so that the clamping bar 17 may be operated in the usual manner and yet the back plate is retained in a convenient position so that it may be immediately swung into place for holding the last end of a piece of meat after the main portion has been held by the clamping bar 17 and sliced by the knife.

It will be noted that it is unnecessary to remove either the clamping bar 17 or the back plate 20, from the machine while the other is in use. As shown in the drawing the lug 33 is so located that the spring standard 15 normally tends to move out of engagement therewith. This makes it necessary to retain the clamping bar 17 in position on the standards while the back plate 20 is in use, for the purpose of holding the standard in engagement with the lug 33. In this way the operator is prevented from removing and mislaying the clamp while using the last slice device. It is apparent that the lug could be reversed so that the standard 15 would normally spring into engaging position and permit the removal of the clamp while the back plate is in use, but it is usually more advisable to keep both holders continuously connected with the machine.

I claim:

1. In a slicing machine, a support for material to be sliced, a plurality of holders independently carried by said support for securing material on said support in position to be sliced, one of said holders having its material-engaging face movable into an operative position parallel with the cutting plane of said slicing machine, and means for retaining each of said holders in inoperative position on said support during operation of the other holder.

2. In a slicing machine, a sliding table for supporting material to be sliced, a plurality of separately operable holders for alternatively securing material on said table, means for supporting one of said holders in an inoperative position upon said table independently of the other of said holders, and means for supporting the same said holder in operative position with its material-engaging face substantially parallel with the cutting plane of said slicing machine.

3. In a slicing machine, a sliding feed table for supporting material to be sliced, an independently operable holder for securing material on said table, means for supporting said holder in an inoperative position removed from the material holding portion of said table, and means for supporting said holder in an operative position with its holding face substantially parallel with the cutting plane of said slicing machine.

4. In a slicing machine, a sliding feed table for supporting material to be sliced, an independently operable holder for securing material on said table, means for supporting said holder upon said table in a position to leave the material holding portion of said table and the space above said portion unobstructed by said holder and means for supporting said holder in operative position across the material holding portion of said table.

5. In a slicing machine, a clamp arranged to hold material to be sliced while considerable quantity of said material remains in a piece being operated upon, a last-slice device having mechanism thereon for holding a piece of material during the cutting of the final portion thereof into slices, and means for supporting said last-slice device in an inoperative position upon said machine independently of said clamp so that said clamp may be operated in the usual manner free from said last-slice device.

6. In a slicing machine, a movable feed table for supporting material to be sliced, and a last-slice device having mechanism thereon for holding material during the cutting of the final portion thereof into slices, said last slice device being permanently connected with said feed table and movable into and out of operative position.

7. In a slicing machine, a movable feed table for supporting material to be sliced, a holder for said material having a holding face arranged substantially parallel with the cutting plane of said slicing machine when in operative position, and means for supporting said holder at one side of said feed table out of the path of the material on said table and at substantially the level of the operating position of said holder.

8. In a slicing machine, a support for material to be sliced, an upright at one side of said support, and a holder for said material pivotally mounted upon said upright and movable horizontally about said upright substantially 90 degrees from operative position to inoperative position at one side of said holder.

9. In a slicing machine, a support for material to be sliced, an upright plate for holding said material, means for holding said plate in position across the front portion of said support, means for swinging said plate to a position at one side of said support and out of the path of material upon said support into an inoperative position, and means for holding said plate in said inoperative position.

10. In a slicing machine, a support for material to be sliced, a last-slice device comprising an upright plate for holding material to be sliced, and means for supporting said pate in an upright position at one side of the path of material upon said support.

11. In a slicing machine, a support for material to be sliced, a clamping device carried by said support, a last-slice device, a standard independent of said clamp for holding said last-slice device upon said support, means for securing said last-slice device in operative position upon said support, and means for swinging said last-slice device about its standard into an inoperative position, and means for holding said device in said last-mentioned position.

12. In a slicing machine, a meat plate having a raised portion at one edge thereof, a holder, means for securing said holder in operative position above the main portion of said meat plate, and means for raising said holder and swinging it into an inoperative position above said raised portion at one side of said plate.

In testimony whereof I have signed my name to this specification, on this 2nd day of July, A. D. 1917.

CORNELIS F. M. van BERKEL.